United States Patent
Schefe et al.

(10) Patent No.: US 10,268,552 B2
(45) Date of Patent: Apr. 23, 2019

(54) DATABASE RECOVERY USING FOREIGN BACKUPS

(71) Applicants: Andre Schefe, Berlin (DE); Bernd Vorsprach, Berlin (DE); Henrik Hempelmann, Havelberg (DE); Martin E. Brunzema, Berlin (DE); Robin Wissbrock, Berlin (DE); Torsten Strahl, Kleinmachnow (DE)

(72) Inventors: Andre Schefe, Berlin (DE); Bernd Vorsprach, Berlin (DE); Henrik Hempelmann, Havelberg (DE); Martin E. Brunzema, Berlin (DE); Robin Wissbrock, Berlin (DE); Torsten Strahl, Kleinmachnow (DE)

(73) Assignee: SAP SE, Walldorf (DE)

( * ) Notice: Subject to any disclaimer, the term of this patent is extended or adjusted under 35 U.S.C. 154(b) by 644 days.

(21) Appl. No.: 14/553,026

(22) Filed: Nov. 25, 2014

(65) Prior Publication Data
US 2016/0147613 A1 May 26, 2016

(51) Int. Cl.
*G06F 17/30* (2006.01)
*G06F 11/14* (2006.01)

(52) U.S. Cl.
CPC ...... *G06F 11/1469* (2013.01); *G06F 2201/80* (2013.01)

(58) Field of Classification Search
None
See application file for complete search history.

(56) References Cited

U.S. PATENT DOCUMENTS

| | | | | |
|---|---|---|---|---|
| 9,122,711 | B1* | 9/2015 | Nicolini | G06F 17/30289 |
| 2004/0003314 | A1* | 1/2004 | Witt | G06F 17/30067 |
| | | | | 714/6.12 |
| 2006/0149997 | A1* | 7/2006 | Chai | G06F 11/1469 |
| | | | | 714/6.3 |
| 2012/0017114 | A1* | 1/2012 | Timashev | G06F 11/1469 |
| | | | | 714/15 |
| 2017/0004047 | A1* | 1/2017 | Deshmukh | G06F 11/1448 |

OTHER PUBLICATIONS

SeveralNines, Aug. 5, 2013, DB Ops, retrieved on Nov. 24, 2017, retrieved from the internet at <URL: https://severalnines.com/blog/how-clone-your-database>.*

* cited by examiner

*Primary Examiner* — Tyler J Torgrimson
(74) *Attorney, Agent, or Firm* — Buckley, Maschoff & Talwalkar LLC

(57) ABSTRACT

A system includes reception, at a target database system, of a request to recover a backup created by a source database system into the target database system, determination of a backup tool configuration file associated with the source database system, determination of a filepath of the backup, determination of a backup filepath associated with the target database system, and request of a recovery of the backup using the backup tool configuration file, wherein the request using the backup tool configuration file includes the filepath of the backup and the backup filepath associated with the target database system.

15 Claims, 6 Drawing Sheets

```
┌─────────────────────────────────────────────────────┐  ← 300
│ Recovery of System GIT                              │
│                                                     │
│ Specify Recovery Type                           │
│   Select a Recovery Type                            │
│ ─────────────────────────────────────────────────── │
│                                                     │
│  ● Recover the Database to its most recent state          ← 310
│  ○ Recover the Database to the following point in time   
│                                                     │
│    Date: [     ]   Time: [     ]                    │
│                                                     │
│    Select Time Zone: [                    ]         │
│                                                     │
│  ○ Recover the Database to a specific data backup or storage snapshot │
│                                                     │
│                                            ,320     │
│                                  [ Next ] [ Cancel ]│
└─────────────────────────────────────────────────────┘
```

*FIG. 3*

Recovery of System GIT

Select A Backup
Select a backup to recover the database

Backups:

| Start Time | Location | Backup Prefix | Available |
|---|---|---|---|
| 2014-11-21 09:41:06 | /usr/sap/H13/SYS/glob... | COMPLETE_DATA_BACKUP | |
| | | | |
| | | | |
| | | | |

←510       [Refresh]  [Show More]

Details of Selected Backup                    520↘

Start Time: 2014-11-21 09:41:06   Destination Type: BACKINT   Source System: H13

Size: 314.24 MB   Backup ID: 141655826607   External Backup ID: BCKINTxCNk6i

Backup Name: /usr/sap/H13/SYS/global/hdb/backint/COMPLETE_DATA_BACKUP

Alternative Location: [           ]

530
[Finish] [Cancel]

*FIG. 5*

DATABASE RECOVERY USING FOREIGN BACKUPS

BACKGROUND

During operation, modern database systems generate backup files which may be used to recover from database crashes. These backup and recovery functions are often performed by dedicated backup tools, which may be provided by third party vendors. A backup tool abstracts the storage which holds the backup files, and may implement its own lifecycle management and access control for the backup files.

It may be desired to copy the contents of one database into another database system, for example, for testing purposes. In principle, copying may be performed by recovering appropriate backup files of the source database system into the target database system. However, current systems are unable to recover a backup file of one database system which is stored in a third party backup tool into another database system.

BRIEF DESCRIPTION OF THE DRAWINGS

FIG. 3 is an outward view of a user interface for initiating recovery of a database system according to some embodiments.

FIG. 5 is an outward view of a user interface for initiating recovery of a database system according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
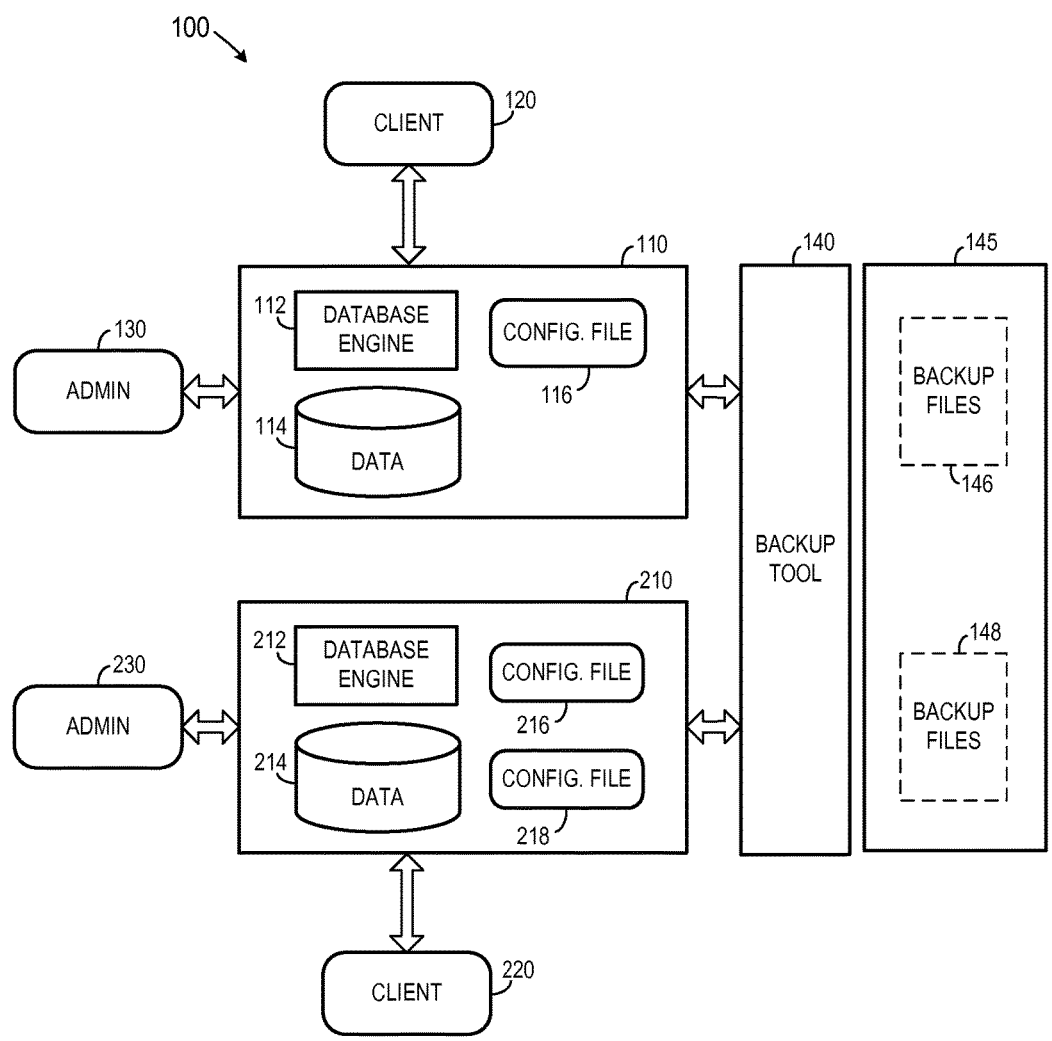
FIG. 1 is a block diagram of a system according to some embodiments.

FIG. 1 is a block diagram of system 100 according to some embodiments. System 100 includes database 110, client 120, and administrator 130 of a first database system, and database 210, client 220 and administrator 230 of a second database system. Generally, each client requests and receives data from its respective database system. For example, database engine 112 of database system 110 manages data 114, and provides data of data 114 to client 130 in response to requests received therefrom.

Each of database systems 110 and 210 may comprise any query-responsive data source or sources that are or become known, including but not limited to a structured-query language (SQL) relational database management system. Data 114 and/or 214 may comprise a relational database, a multi-dimensional database, an eXtendable Markup Language (XML) document, or any other data storage system storing structured and/or unstructured data. Data 114 and/or 214 may be distributed among several relational databases, multi-dimensional databases, and/or other data sources. Embodiments are not limited to any number or types of data sources.

Each of database systems 110 and 210 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database. In some embodiments, data 114 and/or 214 comprises one or more of conventional tabular data, row-based data stored in row format, column-based data stored in columnar format, and object-based data. Each of database systems 110 and 210 may also or alternatively support multi-tenancy by providing multiple logical database systems which are programmatically isolated from one another. Moreover, data 114 and/or 214 may be indexed and/or selectively replicated in an index to allow fast searching and retrieval thereof.

Administrators 130 and 230 provide management of database systems 110 and 210, respectively. For example, administrator 230 may define the structure of tables within data 214, may configure hosts within database 210, may schedule backup operations, and may instruct database engine 212 to recover data 214 based on data backups and, if desired, log backups.

Each of administrator and client of system 100 may comprise one or more devices executing program code of a software application for presenting user interfaces to allow interaction with its respective database system. Presentation of a user interface may comprise any degree or type of rendering. For example, administrator 130 may execute a Web Browser to receive a Web page (e.g., in HTML format) from database system 110, and may render and present the Web page according to known protocols. Each administrator or client may also or alternatively present user interfaces by executing a standalone executable file (e.g., an .exe file) or code (e.g., a JAVA applet) within a virtual machine.

System 100 also includes backup tool 140 and backup file storage 145. Backup tool 140 may create and store backups in file storage 145 in response to commands received from database system 110 and database system 210. The backups may comprise data backups, which include the data of a database system, and/or log backups, which describe changes made to the data during an associated time period.

Configuration file 116 of database system 110 includes backup authorization data and backup storage location information. Database engine 112 provides this data and information to backup tool 140 along with backup-related commands. Backups 146 are stored in the location specified by configuration file 116, and include data and log backups associated with database system 110. Similarly, and backups 148 are stored in the location specified by configuration file 216, and include data and log backups associated with database system 210. Moreover, each backup is stored in association with a system identifier of its source database system. Database system 110 and database system 210 are assigned different system identifiers.

The handover of a backup to the backup tool 140 is done according to named filepaths, or pipes. The names of these pipes are specific to the database system which instructs backup tool 140 to write the backup, and becomes a property of the backup in storage 145. According to some embodiments, a database engine must provide the name of the pipe used to write a backup in order to request the backup for a recovery from backup tool 140.

In addition to configuration file 216 described above, database system 210 also includes configuration file 218. Configuration file 218 includes backup authorization data and backup storage location information associated with database system 110. Configuration file may be a copy of configuration file 116. Configuration file 218 therefore provides database engine 212 with read access to backups 146 of database system 110. Usage of this access will be described below.

Figure 2:
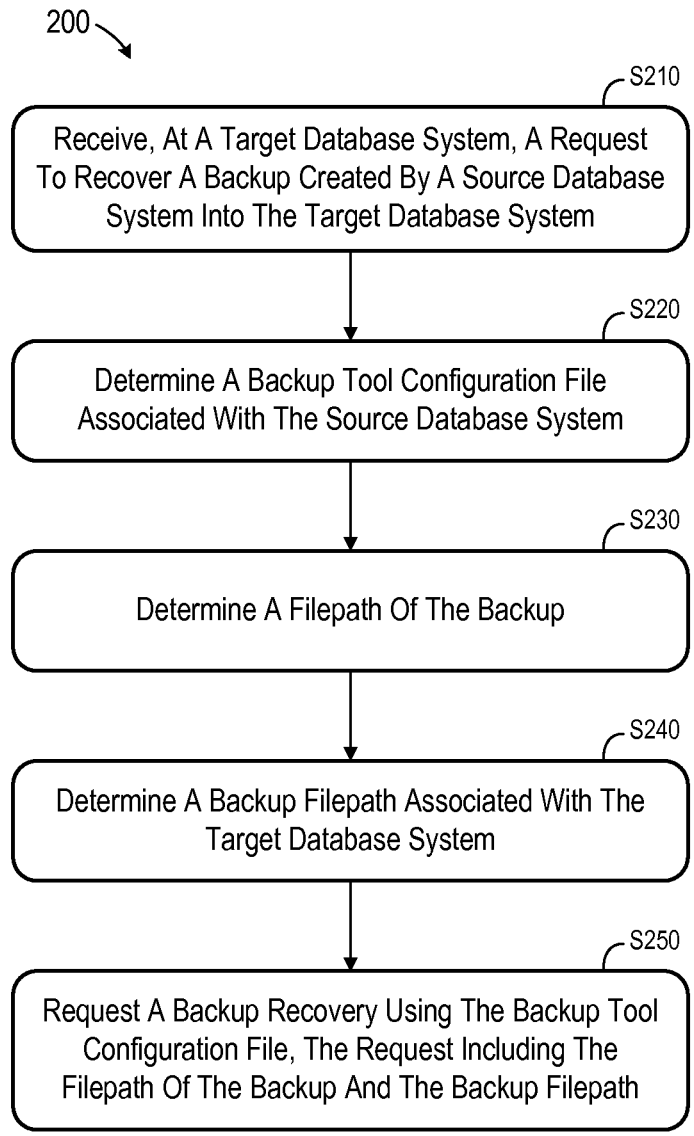
FIG. 2 is a flow diagram of a process according to some embodiments.

FIG. 2 comprises a flow diagram of process 200 according to some embodiments. In some embodiments, various hardware elements of database system 210 execute program code of database engine 220 to perform process 200. Process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Generally, process 200 provides recovery of a backup of a source database system into a target database system. During the recovery, the target database system uses the system identifier of the source database system to determine the appropriate configuration file and the appropriate pipe names to provide to the backup tool in order to access the backups of the source database system.

Initially, at S210, a request is received at a target database system. The request is a request to recover a backup created by a source database system into the target database system. According to the present example, the request is submitted to target database system 210 by an operator operating administrator 230, and is a request to recover a backup created by source database system 110 (and stored among backups 146) into target database system 210.

At the time of the request, the system identifier of source database system 110 is not known by target database system 210. Accordingly, this information is provided to target database system 210 with the request. In one example of S210, administrator 230 invokes a user interface for managing backup operations. As described above, such a user interface may be generated and displayed by an application executing on administrator 230, may comprise a Web page or other interface provided to administrator 230 by database engine 212 and displayed thereby, or may be displayed by any other means.

Figure 4:
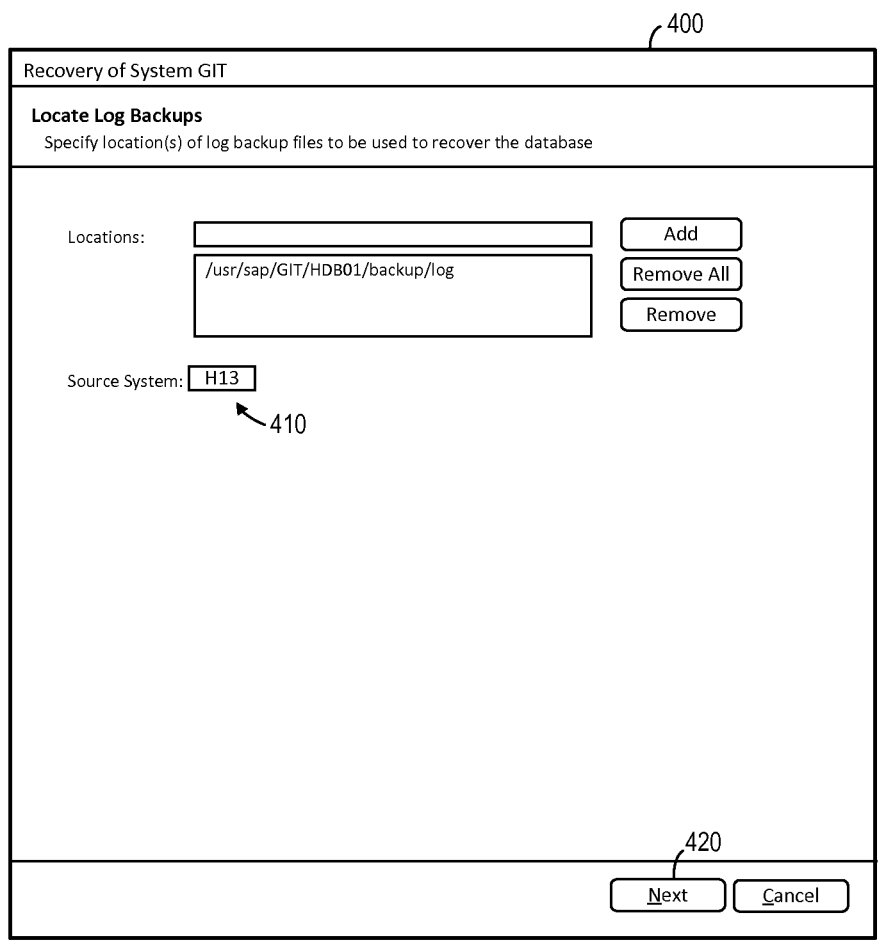
FIG. 4 is an outward view of a user interface for initiating recovery of a database system according to some embodiments.

FIG. 3 is an outward view of user interface 300 according to some embodiments. Embodiments may utilize any other user interface or system for receiving the request at S210. An operator may select any recovery option shown in area 310. In the present example, the operator has selected "Recover the Database to its most recent state". After selection of Next control 320, user interface 400 of FIG. 4 is presented. The operator inputs the system identifier (e.g., "H13") of the source database system into field 410 of user interface 400 and selects Next control 420.

In response, at S220, a backup tool configuration file associated with the source database system is determined. As described above, the file includes configuration information which is needed to access a backup of the source database system. The name of the file is stored as a database parameter of system 210.

In order to support configuration file names which are specific for a system identifier, the stored filename supports a placeholder such as "$(SID)". During typical operation, target database system 210 would substitute its own system identifier for the placeholder in order to locate its configuration file and initiate backups or request recovery from backup tool 140. However, at S220, the appropriate configuration file is determined by expanding the filename with the system identifier of the source database system.

User interface 500 of FIG. 5 is then displayed to allow selection of backups specified in a backup catalog associated with source database system 110. For example, list 510 includes one row for each backup job represented in the backup catalog of the source database system identified by identifier 520. These backup jobs may consist of log backups or data backups.

The backup catalog of source database system 110 is read from backup tool 140 using the appropriate configuration file determined at S220. The operator selects one of the displayed backups from this backup catalog and selects Finish control 530 to initiate the recovery. Database engine 212 computes all backups required for recovery to the selected backup (i.e., if the selected backup is a log backup, otherwise only the selected (data) backup is required).

A filepath (i.e., pipe) of the backup within storage 145 is then determined at S230. The names of the pipes used for backup and recovery may be database system-specific and computed by rule. The name may be "/usr/sap/<SID>/SYS/global/hdb/backint/<backupname>", where the placeholder "<SID>" is the system identifier of the source database system (e.g., "H13"). Similarly, at S240, a backup filepath associated with the target database system is determined, by substituting the placeholder for the system identifier of the target database system.

A backup recovery is requested at S250 based on the system identifier of the source system and the parameters determined at S220, S230 and S240. According to the present example, target database system 210 requests a recovery from backup tool 140 using the configuration file determined at S220, and the request includes the system identifier of the source system, the pipe name including the substituted system identifier of the source database system and the target pipe name including the substituted system identifier of the target database system. In response to the request, backup tool 140 uses the system identifier of the source system and the original pipe name to identify the required backups among backups 146 of storage 145 and uses the target pipe name to send the backup into this pipe. Database system 210 expects and receives the backup in the target pipe and conducts a recovery using its standard processes.

Figure 6:
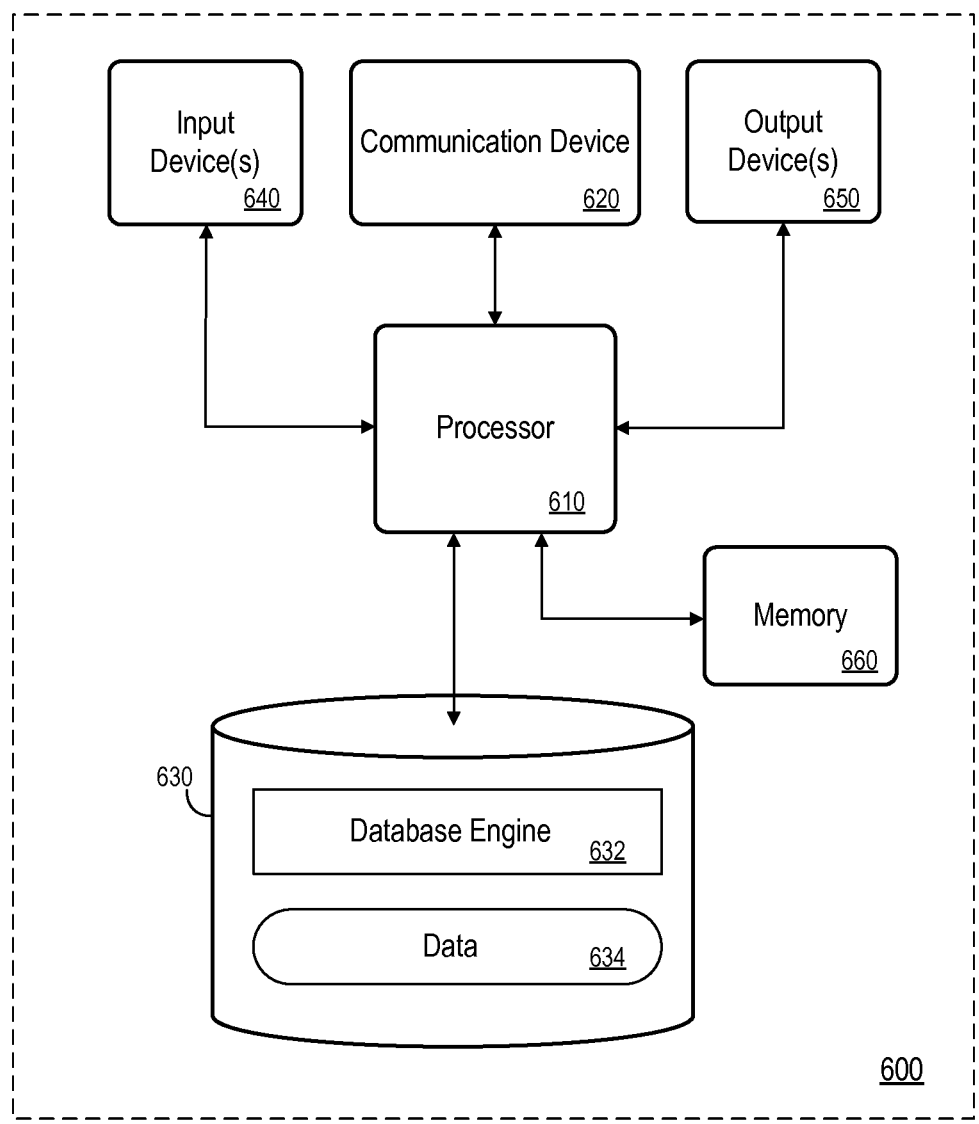
FIG. 6 is a block diagram of an apparatus according to some embodiments.

FIG. 6 is a block diagram of system 600 according to some embodiments. System 600 may comprise a general-purpose computing system and may execute program code to perform any of the processes described herein. System 600 may comprise an implementation of database system 210 according to some embodiments. System 600 may include other unshown elements according to some embodiments.

System 600 includes processor 610 operatively coupled to communication device 620, data storage device 630, one or more input devices 640, one or more output devices 650 and memory 660. Communication device 620 may facilitate communication with external devices, such as a reporting client, or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM).

Database engine 632 may comprise program code executed by processor 610 to cause apparatus 600 to perform any one or more of the processes described herein. Embodiments are not limited to execution of these processes by a single apparatus. Data 634 may include data 214 as described above. As also described above, data 214 may be implemented using volatile memory such as memory 660. Data storage device 630 may also store data and other program code for providing additional functionality and/or which are necessary for operation of system 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units.

Embodiments are therefore not limited to any specific combination of hardware and software. Embodiments described herein are solely for the purpose of illustration. Those skilled in the art will recognize other embodiments may be practiced with modifications and alterations to that described above.

What is claimed is:

1. A computing system comprising:
   a memory storing processor-executable program code; and
   a processor to execute the processor-executable program code in order to cause the computing system to:
      receive, at a target database system, a request to recover a backup created by a source database system and stored in a third party backup tool into the target database system, the request comprising a system identifier of the source database system;
      determine a backup tool configuration file associated with the source database system;
      determine a filepath including a placeholder;
      substitute the placeholder with the system identifier of the source database system to determine a filepath of the backup;
      determine a backup filepath associated with the target database system; and
      request a recovery of the backup using the backup tool configuration file,
      wherein the request using the backup tool configuration file includes the filepath of the backup and the backup filepath associated with the target database system.

2. A computing system according to claim 1, wherein the processor is further to execute the processor-executable program code in order to cause the computing system to:
   receive, at the target database system, a request to recover a second backup created by the source database system and stored in the third party backup tool into the target database system;
   determine the backup tool configuration file associated with the source database system;
   determine a filepath of the second backup; and
   request a recovery of the backup using the backup tool configuration file,
   wherein the request includes the filepath of the second backup and the backup filepath associated with the target database system.

3. A computing system according to claim 1, wherein the processor is further to execute the processor-executable program code in order to cause the computing system to:
   request a backup catalog associated with the source database system using the backup tool configuration file;
   present the backup catalog; and
   receive a selection of the backup.

4. A computing system according to claim 1, wherein determination of the backup tool configuration file comprises:
   determination of a parameter of the target database system, the parameter comprising a filename including a placeholder; and
   substitution of the placeholder with the system identifier of the source database system.

5. A computing system according to claim 4, wherein determination of the filepath of the backup comprises:
   determination of a filepath including a second placeholder; and
   substitution of the second placeholder with the system identifier of the source database system.

6. A non-transitory computer-readable medium storing program code, the program code executable by a processor of a computing system to cause the computing system to:
   receive, at a target database system, a request to recover a backup created by a source database system and stored in a third party backup tool into the target database system, the request comprising a system identifier of the source database system;
   determine a backup tool configuration file associated with the source database system;
   determine a filepath including a placeholder;
   substitute the placeholder with the system identifier of the source database system to determine a filepath of the backup;
   determine a backup filepath associated with the target database system; and
   request a recovery of the backup using the backup tool configuration file, wherein the request using the backup tool configuration file includes the filepath of the backup and the backup filepath associated with the target database system.

7. A non-transitory computer-readable medium according to claim 6, the program code further executable by a processor of a computing system to cause the computing system to:

receive, at the target database system, a request to recover a second backup created by the source database system and stored in the third party backup tool into the target database system;

determine the backup tool configuration file associated with the source database system;

determine a filepath of the second backup; and request a recovery of the backup using the backup tool configuration file, wherein the request includes the filepath of the second backup and the backup filepath associated with the target database system.

8. A non-transitory computer-readable medium according to claim 6, the program code further executable by a processor of a computing system to cause the computing system to:

request a backup catalog associated with the source database system using the backup tool configuration file;

present the backup catalog; and receive a selection of the backup.

9. A non-transitory computer-readable medium according to claim 6, wherein determination of the filepath of the backup comprises:

determination of a filepath including a second placeholder; and substitution of the second placeholder with the system identifier of the source database system.

10. A non-transitory computer-readable medium according to claim 6, wherein determination of the backup tool configuration file comprises:

determination of a parameter of the target database system, the parameter comprising a filename including a placeholder; and substitution of the placeholder with the system identifier of the source database system.

11. A computer-implemented method comprising:

receiving, at a target database system, a request to recover a backup created by a source database system and stored in a third party backup tool into the target database system, the request comprising a system identifier of the source database system;

determining a backup tool configuration file associated with the source database system;

determining a filepath including a placeholder;

substituting the placeholder with the system identifier of the source database system to determine a filepath of the backup;

determining a backup filepath associated with the target database system; and requesting a recovery of the backup using the backup tool configuration file, wherein the request using the backup tool configuration file includes the filepath of the backup and the backup filepath associated with the target database system.

12. A computer-implemented method according to claim 11, further comprising:

receiving, at the target database system, a request to recover a second backup created by the source database system and stored in the third party backup tool into the target database system;

determining the backup tool configuration file associated with the source database system;

determining a filepath of the second backup; and requesting a recovery of the backup using the backup tool configuration file, wherein the request includes the filepath of the second backup and the backup filepath associated with the target database system.

13. A computer-implemented method according to claim 11, further comprising:

requesting a backup catalog associated with the source database system using the backup tool configuration file;

presenting the backup catalog; and receiving a selection of the backup.

14. A computer-implemented method according to claim 11, wherein determining the backup tool configuration file comprises:

determining a parameter of the target database system, the parameter comprising a filename including a placeholder; and substituting the placeholder with the system identifier of the source database system.

15. A computer-implemented method according to claim 14, wherein determination of the filepath of the backup comprises:

determining a filepath including a second placeholder; and substituting the second placeholder with the system identifier of the source database system.

* * * * *